(12) United States Patent
Lee et al.

(10) Patent No.: US 11,563,914 B2
(45) Date of Patent: Jan. 24, 2023

(54) IMAGE ENCODER, AN IMAGE SENSING DEVICE, AND AN OPERATING METHOD OF THE IMAGE ENCODER

(71) Applicant: SAMSUNG ELECTRONICS CO., LTD., Suwon-si (KR)

(72) Inventors: Won Seok Lee, Suwon-si (KR); Seong Wook Song, Seoul (KR); Yun Seok Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 214 days.

(21) Appl. No.: 17/129,131

(22) Filed: Dec. 21, 2020

(65) Prior Publication Data

US 2021/0344869 A1    Nov. 4, 2021

(30) Foreign Application Priority Data

Apr. 29, 2020    (KR) ........................ 10-2020-0051927

(51) Int. Cl.
*H04N 5/917* (2006.01)
*H04N 5/232* (2006.01)
(Continued)

(52) U.S. Cl.
CPC ......... *H04N 5/917* (2013.01); *H04N 5/23229* (2013.01); *H04N 19/14* (2014.11)

(58) Field of Classification Search
CPC .... H04N 5/917; H04N 5/23229; H04N 19/14; H04N 5/772; H04N 19/55; H04N 9/8042;
(Continued)

(56) References Cited

U.S. PATENT DOCUMENTS 9,584,815 B2    2/2017 Kwon et al.
9,654,780 B2    5/2017 Jeong et al.
(Continued)

FOREIGN PATENT DOCUMENTS

JP    6256565    12/2017
KR    10-255794    5/2000
(Continued)

*Primary Examiner* — Christopher K Peterson
(74) *Attorney, Agent, or Firm* — F. Chau & Associates, LLC

(57) ABSTRACT

The present disclosure provides an image encoder. The image encoder is configured to encode an original image and reduce compression loss. The image encoder comprises an image signal processor and a compressor. The image signal processor is configured to receive a first frame image and a second frame image and generates a compressed image of the second frame image using a boundary pixel image of the first frame image. The image signal processor may include memory configured to store first reference pixel data which is the first frame image. The compressor is configured to receive the first reference pixel data from the memory and generate a bitstream obtained by encoding the second frame image based on a difference value between the first reference pixel data and the second frame image. The image signal processor generates a compressed image of the second frame image using the bitstream generated by the compressor.

20 Claims, 20 Drawing Sheets

(51) Int. Cl.
*H04N 19/14* (2014.01)
*H04N 5/77* (2006.01)
*H04N 19/55* (2014.01)
*H04N 9/804* (2006.01)
*H04N 19/433* (2014.01)
*H04N 19/154* (2014.01)
*H04N 19/186* (2014.01)
*H04N 19/503* (2014.01)
*H04N 1/417* (2006.01)
*H04N 5/225* (2006.01)

(58) Field of Classification Search
CPC .. H04N 19/433; H04N 19/154; H04N 19/186; H04N 19/503; H04N 1/4175; H04N 5/2251
See application file for complete search history.

(56) References Cited

U.S. PATENT DOCUMENTS

| | | | |
|---|---|---|---|
| 2001/0046318 A1 | 11/2001 | Lee et al. | |
| 2011/0280491 A1* | 11/2011 | Lee | H04N 19/597 |
| | | | 382/233 |
| 2016/0330481 A1* | 11/2016 | Zhang | H04N 19/96 |
| 2020/0275095 A1* | 8/2020 | Bokov | H04N 19/593 |

FOREIGN PATENT DOCUMENTS

| | | |
|---|---|---|
| KR | 10-2000-0052205 | 8/2000 |
| KR | 10-2021-0052095 | 5/2021 |

* cited by examiner

| | | | | | | | | | | |
|---|---|---|---|---|---|---|---|---|---|---|
| 590— | | A | A | A | A | A | A | A | ... | A | A |
| 550— | | A | A | A | A | A | A | A | ... | A | A |
| A | A | G | R | G | R | G | R | G | R | ... | G | R |
| A | A | B | G | B | G | B | G | B | G | ... | B | G |
| A | A | G | R | G | R | G | R | G | R | ... | G | R |
| A | A | B | G | B | G | B | G | B | G | ... | B | G |
| A | A | G | R | G | R | G | R | G | R | ... | G | R |
| A | A | B | G | B | G | B | G | B | G | ... | B | G |
| A | A | G | R | G | R | G | R | G | R | ... | G | R |
| A | A | B | G | B | G | B | G | B | G | ... | B | G |
| ... | ... | ... | ... | ... | ... | ... | ... | ... | ... | ... | ... |
| A | A | G | R | G | R | G | R | G | R | ... | G | R |
| A | A | B | G | B | G | B | G | B | G | ... | B | G |

—500

IMAGE ENCODER, AN IMAGE SENSING DEVICE, AND AN OPERATING METHOD OF THE IMAGE ENCODER

This application claims priority from Korean Patent Application No. 10-2020-0051927 filed on Apr. 29, 2020 in the Korean Intellectual Property Office, the disclosure of which is incorporated herein by reference in its entirety.

BACKGROUND

1. Technical Field

The present disclosure relates to an image encoder, an image sensing device, and a method of operating the image encoder.

2. Description of the Related Art

Modern computers use image compression as a method to reduce resources for image storage or data transmission. A storage device in a computer can store more compressed image data than uncompressed image data. Additionally, data transmission over air or wire are faster and more reliable by transferring compressed image files.

Image compression is a process of generating encoded image data using less computational storage compared to original image data. Further, image decompression is a process of decoding encoded image data to generate reconstructed image data. The reconstructed image data may differ from the original image data, depending on the encoding and decoding methods.

A Differential Pulse Code Modulation (DPCM) is an encoding method to compress the original image data using a surrounding pixel value. However, a boundary pixel located at an edge of the original image may not be capable of performing DPCM compression because there is no peripheral pixel to be referred to.

Additionally, if a difference between the boundary pixel value and the surrounding pixel value is large, an error may affect the boundary pixel and the DPCM of the pixel values of other pixels. Therefore, there is a need in the art for a compression method that considers various pixel information when compressing an image when peripheral pixel data is not available.

SUMMARY

Aspects of the present disclosure provide an image encoder configured to encode an original image. Aspects of the present disclosure also provide an image encoder capable of reducing a compression loss.

However, aspects of the present disclosure are not restricted to the one set forth herein. The above and other aspects of the present disclosure will become more apparent to one of ordinary skill in the art to which the present disclosure pertains by referencing the detailed description of the present disclosure given below. Details of embodiments are included in the detailed description and drawings.

According to an aspect of the present disclosure, there is provided an image encoder comprising an image signal processor configured to receive a first frame image and a second frame image (e.g., that temporally follows the first frame image) and generate a compressed image of the second frame image based on a boundary pixel image of the first frame image, the image signal processor comprising a memory configured to store first reference pixel data which is the boundary pixel image of the first frame image; and a compressor configured to receive the first reference pixel data from the memory and generate a bitstream obtained by encoding the second frame image based on a difference value between the first reference pixel data and original pixel data of the second frame image, wherein the image signal processor generates the compressed image of the second frame image based on (e.g., using) the bitstream.

According to another aspect of the present disclosure, there is provided an image encoder configured to receive a first frame image and a second frame image that temporally follows the first frame image, the image encoder comprising: a memory configured to store first reference pixel data which is a boundary pixel image of the first frame image; a compressor configured to receive the first reference pixel data from the memory, generate a first bitstream obtained by encoding original pixel data of the second frame image based on a difference value between the first reference pixel data and the original pixel data of the second frame image, and output the first generated bitstream; and a reconstructor configured to reconstruct the first bitstream to generate second reference pixel data which is a boundary pixel image of the second frame image.

According to another aspect of the present disclosure, there is provided a method for operating an image encoder, the method comprising: receiving a first frame image and a second frame image, wherein the second frame image is received at a different time than the first frame image is received; storing first reference pixel data which is a first boundary pixel image of the first frame image; generating a bitstream obtained by encoding original pixel data of the second frame image based on a difference value between the stored first reference pixel data and the original pixel data of the second frame image; outputting the generated bitstream; and reconstructing the bitstream to generate second reference pixel data which is a second boundary pixel image of the second frame image.

BRIEF DESCRIPTION OF THE DRAWINGS

The above and other aspects and features of the present disclosure will become more apparent by describing, in detail, embodiments thereof with reference to the attached drawings, in which:

FIG. 2 is a diagram showing a Bayer image acquired by a color filter according to some embodiments of the present disclosure.

FIGS. 9 and 10 are diagrams for explaining the method of compressing the original pixel data according to some embodiments of the present disclosure.

Figure 11:
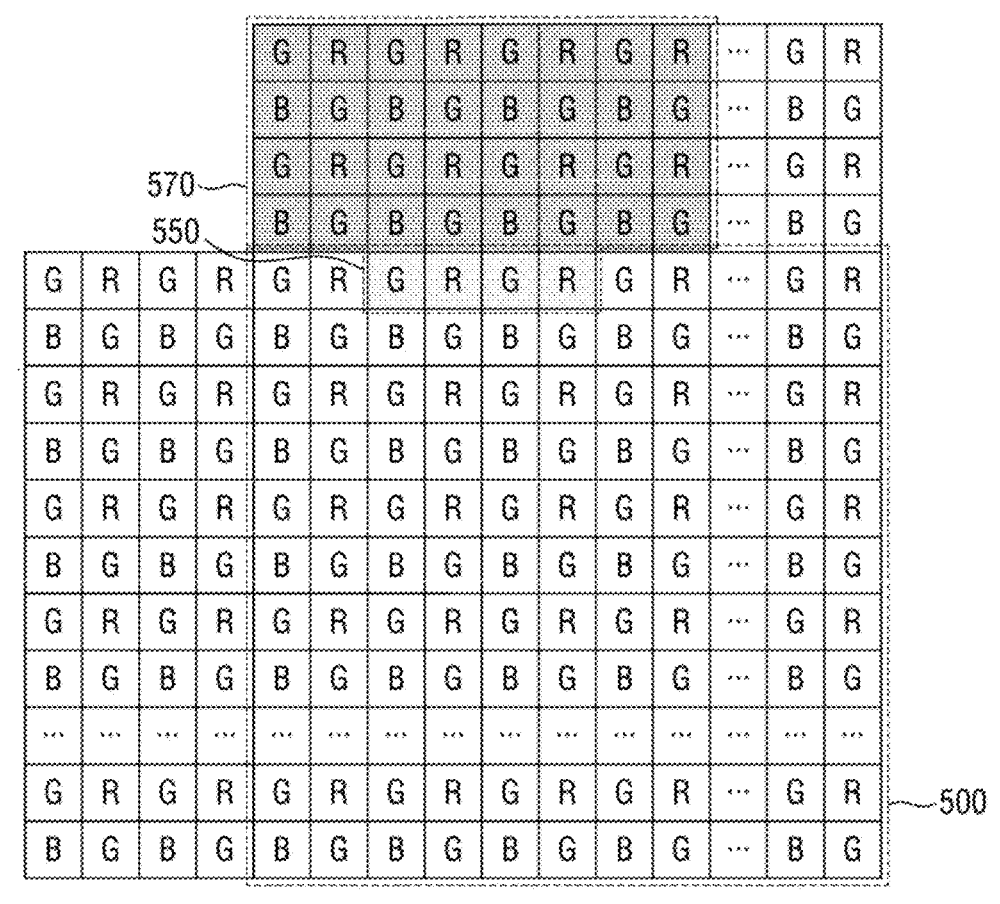

FIG. 11 is a diagram for explaining a method of compressing original pixel data according to some embodiments of the present disclosure.

Figure 12:
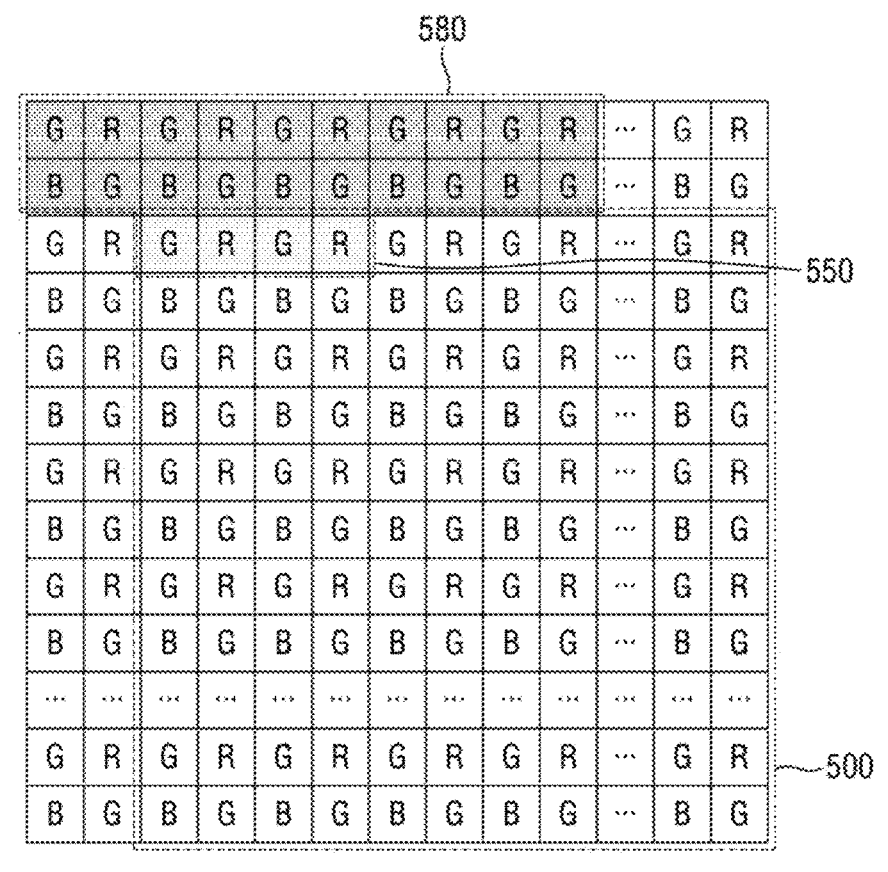

FIG. 12 is a diagram for explaining a method of compressing original pixel data according to some embodiments of the present disclosure.

FIG. 13 is a diagram for explaining a method of compressing original pixel data according to some embodiments of the present disclosure.

DETAILED DESCRIPTION OF THE EMBODIMENTS

Image compression is a process of generating encoded image data (e.g., compressed encoded image data) using less computational storage compared to original image data (e.g., original uncompressed image data). Further, image decompression is a process of decoding encoded image data to generate reconstructed image data. The reconstructed image data may differ from the original image data, depending on the encoding and decoding methods (e.g., and the amount of compression loss). For instance, Differential Pulse Code Modulation (DPCM) is an encoding method used to compress original image data using surrounding pixel values.

In a scenario where original pixel data (e.g., uncompressed pixel data) associated with a boundary condition does have data for reference to the original data, compression of an image may be difficult or errors may occur. For instance, a boundary pixel located at an edge of an original image may not be capable of performing DPCM compression because there is no peripheral pixel to be referred to. Generally a boundary condition may refer to a condition where original pixel data does not have reference data in the present frame image (e.g., a condition where the original pixel data is located at the boundary, such as a top boundary or a left boundary, of a frame image).

The present disclosure relates generally to an image encoder, an image sensing device, and a method of operating the image encoder. More particularly, embodiments of the present disclosure relate to a method of compressing original image data associated with a boundary condition (e.g., compressing original image data without corresponding boundary data in the original image data). In some embodiments, the present disclosure performs image compression by referencing pixel data located around reference pixel data of a previous frame image that corresponds to the original image data being compressed.

The image encoder of the present disclosure is configured to encode an original image while reducing compression loss. Reduction of compression loss for original pixel data associated with a boundary condition may be realized by using reference pixels of boundary images associated with a previous frame image. Such reference pixels may be associated with pixel values close to the pixel value of the original pixel data. In some examples, the average value of pixel values in a boundary image of a previous frame image may be used as reference pixels such that the stored reference pixel data can be reduced and compression reliability may be increased. Embodiments according to the technical idea of the present disclosure are described with reference to the accompanying drawings.

An electronic device 1 with an image encoder will be described below with reference to FIGS. 1 to 4.

Figure 1:
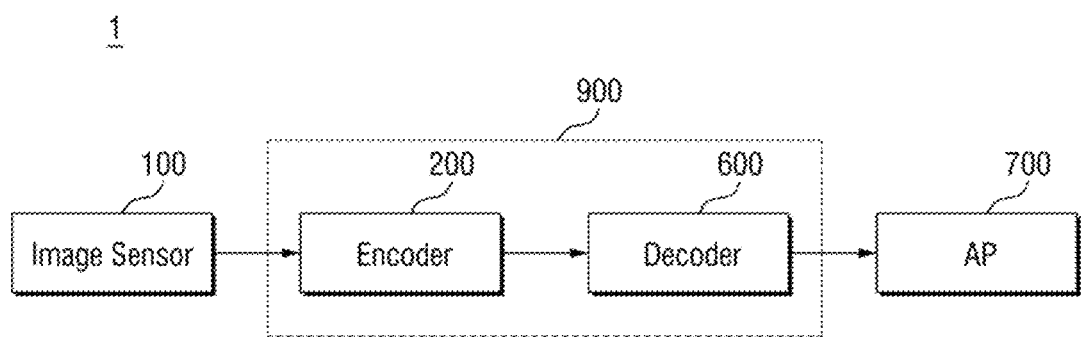
FIG. 1 is a block diagram for explaining an electronic device with the image encoder according to some embodiments of the present disclosure.
Figure 2:
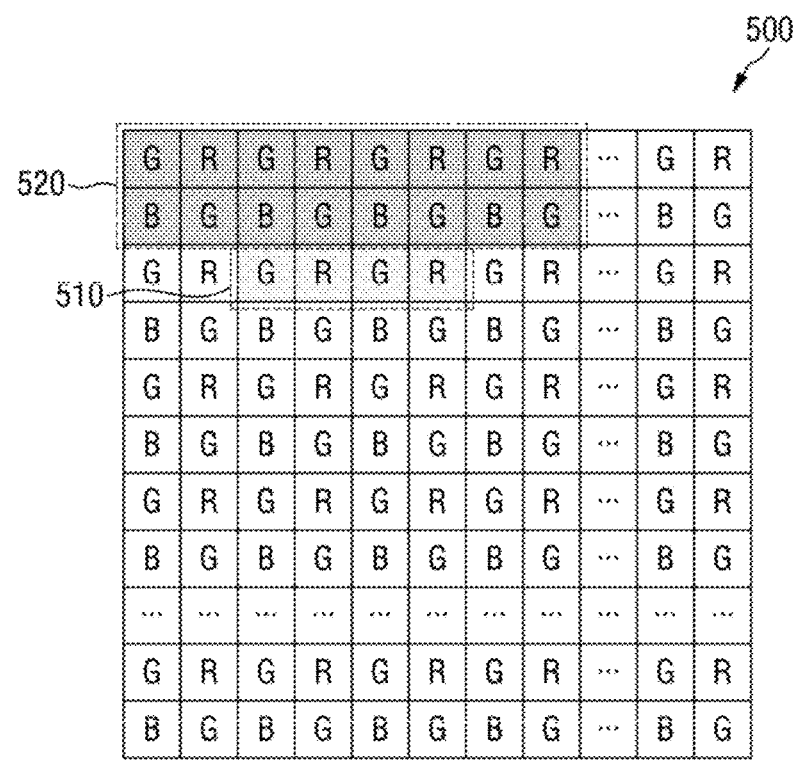
Figure 3:
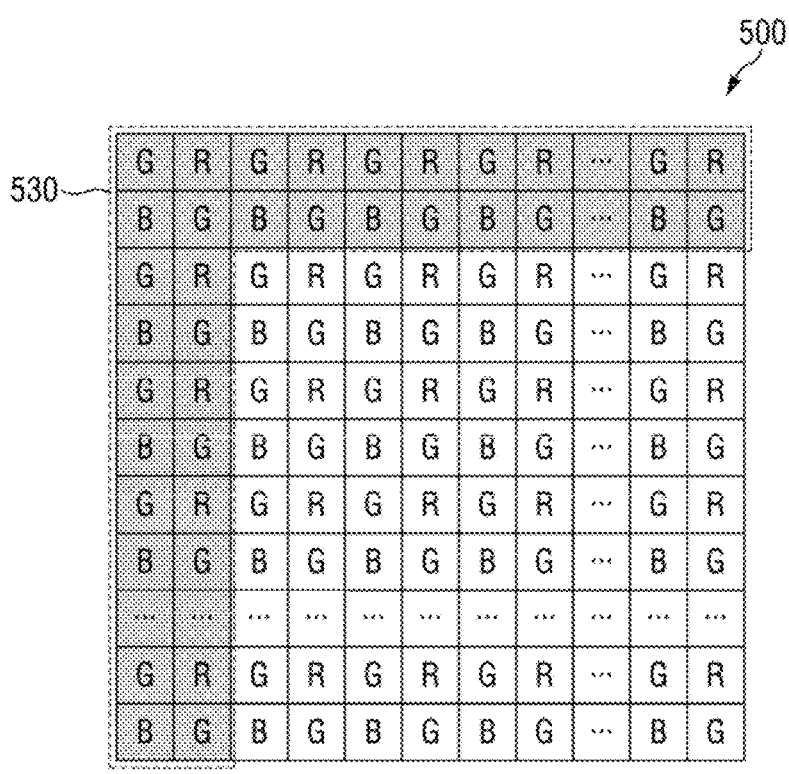
FIGS. 3 and 4 are diagrams for explaining boundary pixel data according to some embodiments of the present disclosure.
Figure 4:
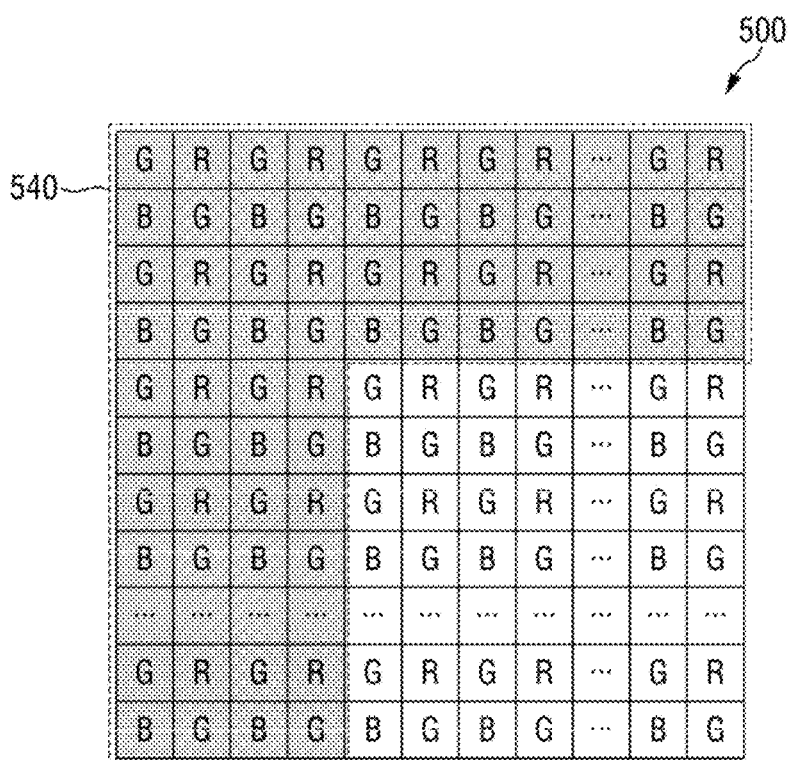

FIG. 1 is a block diagram for explaining an electronic device with the image encoder according to some embodiments of the present disclosure. FIG. 2 is a diagram showing a Bayer image acquired by a color filter according to some embodiments of the present disclosure. FIGS. 3 and 4 are diagrams for explaining boundary pixel data according to some embodiments of the present disclosure.

The electronic device 1 may be an electronic device that captures and stores an image of a subject using a solid-state image sensor (e.g., such as a Complementary Metal Oxide Semiconductor (CMOS). For example, the electronic device 1 may include a digital camera, a digital video camera, a mobile phone, and a tablet computer.

Referring to FIG. 1, the electronic device 1 may include a color filter 100, an encoder 200, a decoder 600, and an application processor 700.

The color filter 100 may acquire original pixel data from the optical signal. The original pixel data may mean a pixel value of the original pixel. One half of the pixels in the color filter 100 may detect a green signal. One quarter thereof may detect a red signal and one quarter thereof may detect a blue signal. For example, the color filter 100 may have a configuration in which 2×2 size cells with one red (R) pixel, one blue (B) pixel and two green (G) pixels are repeatedly arranged. However, according to the technical idea of the present disclosure, the embodiment is not limited thereto. For example, the color filter 100 may have a configuration in which 2×2 size cells with one red (R) pixel, one blue (B) pixel, and two wide green (G) pixels are repeatedly arranged.

A pixel (or picture element) refers to the smallest addressable element in a display device, and the smallest controllable element of a picture represented on the device. In some cases, each pixel may represent a sample of an original image. The color and intensity of each pixel is variable. In color imaging systems, a color may be represented by three or four component intensities such as red, green, and blue, or cyan, magenta, yellow, and black.

The encoder 200 may compress original pixel data 510 provided from the color filter 100 to reduce the image data size. Referring to FIG. 2, a Bayer image 500 may include original pixel data 510 acquired by the color filter 100. In some embodiments, the encoder 200 may generate encoded data for the original pixel data 510, using a reference pixel data 520. However, the embodiment according to the technical idea of the present disclosure is not limited thereto. The encoder 200 may generate the encoded data for the original pixel data 510, without using the reference pixel data 520. The encoded data of the original pixel data 510 may be stored in the bitstream generated by the encoder 200.

Referring to FIG. 3, the Bayer image 500 may include first boundary pixel data 530. The first boundary pixel data 530 may include a boundary pixel image of the Bayer image 500. For example, the first boundary pixel data 530 may include a pixel image of a first row of the boundary of the Bayer image 500. For example, the first boundary pixel data 530 may include pixel image provided from one line in which 2×2 size cells with one red (R) pixel, one blue (B) pixel, and two green (G) pixels are arranged in a row. In another example, the first boundary pixel data 530 may include a pixel image of a first column of a boundary of the Bayer image 500.

Referring to FIG. 4, the Bayer image 500 may include second boundary pixel data 540. The second boundary pixel data 540 may include a boundary pixel image of the Bayer image 500. For example, the second boundary pixel data 540 may include a pixel image of the first and second rows of the boundary of the Bayer image 500. For example, the second boundary pixel data 540 may include pixel image provided from two lines in which 2×2 size cells with one red (R) pixel, one blue (B) pixel, and two green (G) pixels are arranged in a row. As another example, the second boundary pixel data 540 may include a pixel image of the first and second columns of the Bayer image 500.

Referring to FIG. 1 again, a decoder 600 may receive the bitstream generated from the encoder 200. The decoder 600 may decode the received bitstream to generate decoded data. The decoder 600 may provide the data obtained by decoding the bitstream to the application processor 700.

The application processor 700 may include a central processing unit (CPU), a microprocessor or an MCU (Micro Controller Unit) and may perform post-processing on the decoded data received from the decoder 600. Post-processing may include an application of an Image Enhancement Algorithm on image artifacts. For example, although the application processor 700 may perform white balancing, denoising, demosaicing, lens shading, gamma correction or the like on the received decoded data, the embodiment according to the technical idea of the present disclosure is not limited thereto.

Generally, a processor may refer to an intelligent hardware device (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for image processing, modem processing, baseband processing, digital signal processing, or transmission processing.

An image signal processor 900 may include the encoder 200 and the decoder 600. The image signal processor 900 may receive the original image data from the color filter 100 to provide the data to the application processor 700 through the encoder 200 and the decoder 600. As the size of the image data is reduced by compressing the original image data through the encoder 200, memory space efficiency and bandwidth efficiency of the electronic device 1 can be enhanced.

The encoder 200 will be described below with reference to FIGS. 5 to 7.

Figure 5:
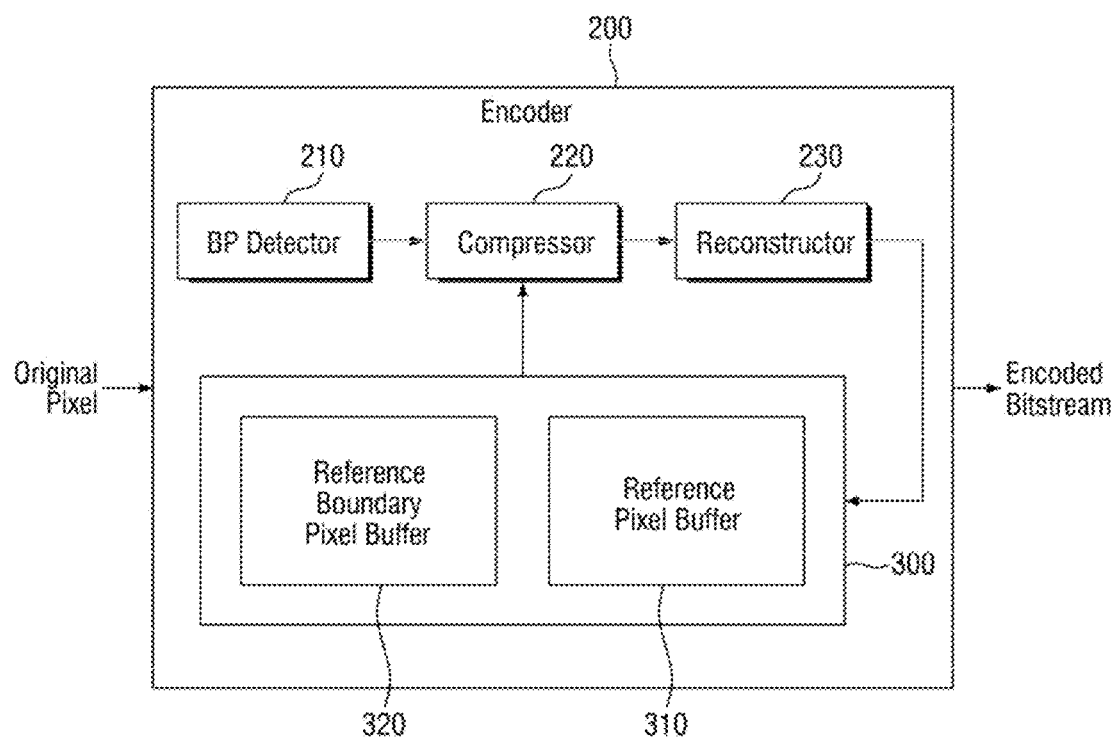
FIGS. 5 and 6 are block diagrams for explaining an encoder according to some embodiments of the present disclosure.
Figure 6:
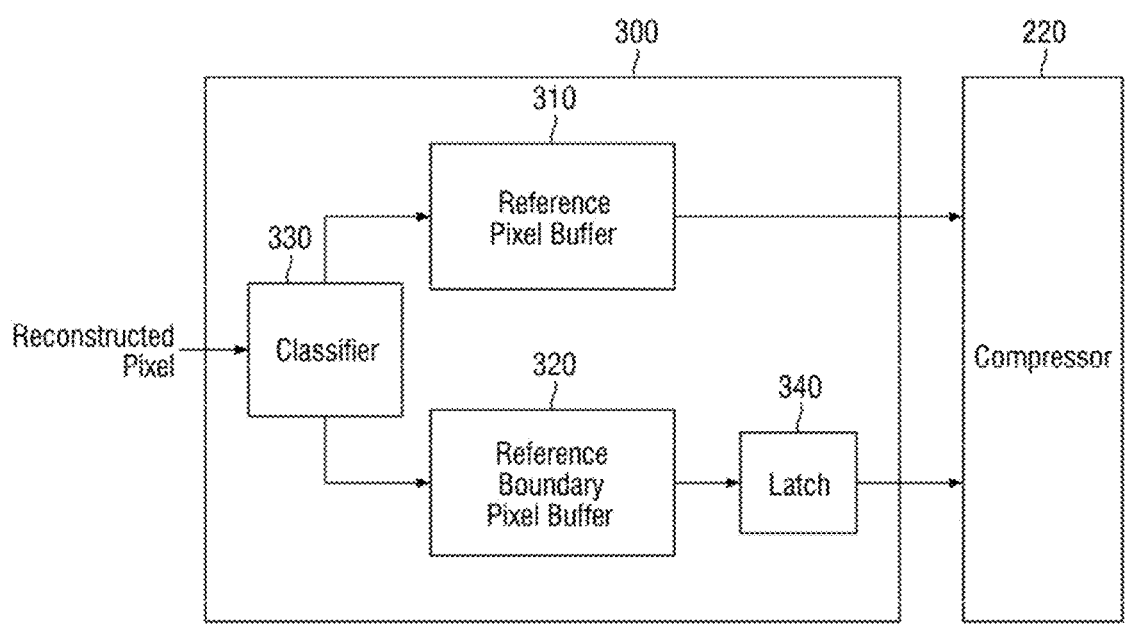

FIGS. 5 and 6 are block diagrams for explaining an encoder according to some embodiments of the present disclosure. FIG. 7 is a flowchart for explaining a method of operating the encoder of FIG. 6.

Referring to FIG. 5, the encoder 200 may include a bad pixel detector 210, a compressor 220, a reconstructor 230, and a buffer 300. The encoder 200 may compress the provided original pixel data to output a bitstream with the encoded data.

The bad pixel detector 210 may detect a bad pixel in the pixel data acquired by the Bayer color filter. The bad pixel may include a static bad pixel caused by physical errors at positions of the Bayer color filter and irregularly caused dynamic bad pixel. In some cases, the bad pixel detector 210 may compare the signal levels of a plurality of pixels located horizontally around the pixel to be inspected. The comparison may be used to determine whether the pixel to be inspected is included in an edge region of an entire image and to determine whether the pixel to be inspected is defective if the pixel to be inspected is not included in the edge region. In some embodiments, bad pixels may be detected by comparing the signal levels of peripheral pixels of the target pixel. The bad pixel detector 210 may tag attribute information (e.g., a flag) indicating the bad pixels on the pixels determined to be bad pixels.

The compressor 220 may perform encoding of the original pixel data. In some embodiments, the compressor 220 may receive the original pixel data indicating that a bad pixel may be provided from the bad pixel detector 210. The compressor 220 may generate a bitstream with encoded data of the original pixel data. For example, the compressor 220 may perform Differential Pulse Code Modulation (DPCM) in which encoding is performed based on the difference value between the original pixel data and the reference pixel data to generate the bitstream. However, the embodiment according to the technical idea of the present disclosure is not limited thereto, and the bitstream may be generated in another method. The compressor 220 may provide the generated bitstream to the reconstructor 230.

The reconstructor 230 may receive the bitstream from the compressor 220 and may reconstruct the bitstream to generate reference pixel data. The reference pixel data may correspond to the original pixel data. The reconstructor 230 may provide the reference pixel data to the buffer 300.

The buffer 300 may receive and store the reference pixel data reconstructed from the reconstructor 230. The memory may include, but is not limited to, volatile memory such as a dynamic random access memory (DRAM) and a static random access memory (SRAM), and may also include non-volatile memory such as a flash memory, a PRAM (Phase-change Random Access Memory) a MRAM (Magnetic Random Access Memory), a ReRAM (Resistive Random Access Memory), and a FRAM (Ferroelectrics Random Access Memory). Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

The buffer 300 may provide the reference pixel data for encoding the original pixel data to the compressor 220. The reference pixel data may be pixel data located around the original pixel data. Additionally or alternatively, the reference pixel data may be pixel data located around the original pixel data of the previous frame image.

Figure 7:
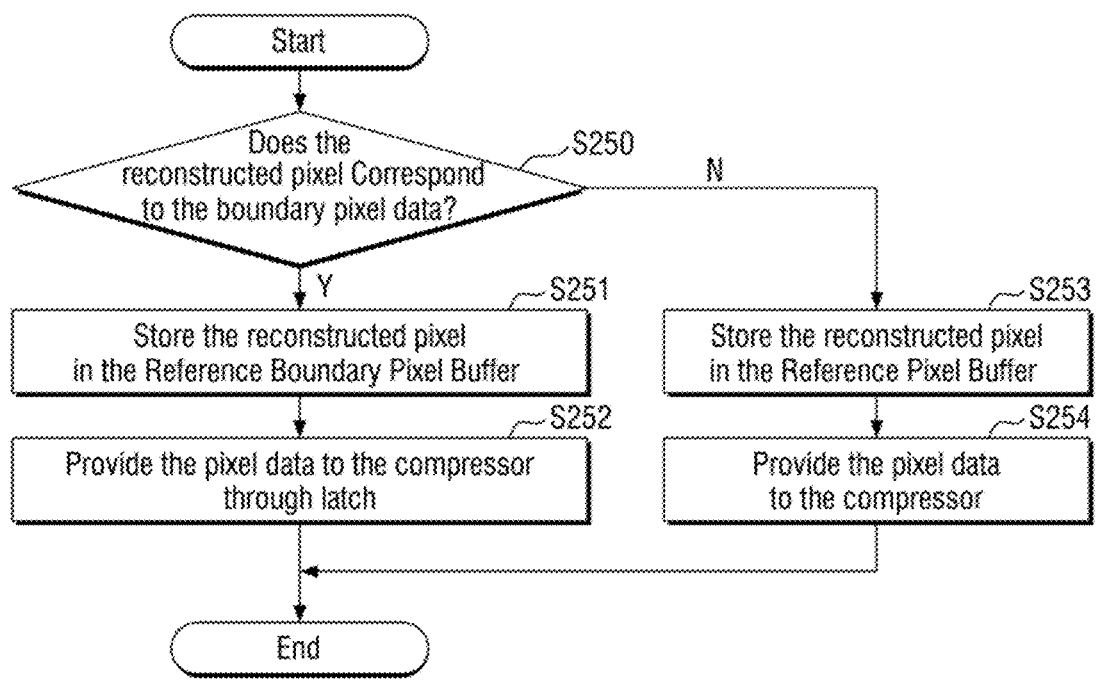
FIG. 7 is a flowchart for explaining a method of operating the encoder of FIG. 6.

Referring to FIGS. 6 and 7, the buffer 300 may include a reference pixel buffer 310, a reference boundary pixel buffer 320, a classifier 330, and a latch 340. The reconstructed reference pixel data may be provided to the buffer 300 from the reconstructor 230. The classifier 330 may receive the reference pixel data.

The classifier 330 may determine whether the reconstructed reference pixel data corresponds to boundary pixel data (S250). For example, the classifier 330 may determine whether the reconstructed reference pixel data is included in the boundary pixel image of the Bayer image 500. For example, referring to FIG. 3, the classifier 330 may determine whether the reconstructed reference pixel data is included in the first boundary pixel data 530. For example, referring to FIG. 4, the classifier 330 may determine whether the reconstructed reference pixel data is included in the second boundary pixel data 540.

Referring to FIG. 7 again, if the reconstructed reference pixel data corresponds to the boundary pixel data (S250-Y), the reconstructed reference pixel data may be stored in the reference boundary pixel buffer 320 (S251). For example, the reference boundary pixel data may be stored in the reference boundary pixel buffer 320. The reference boundary pixel buffer 320 may provide the stored reference boundary pixel data to the compressor 220 through the latch 340 (S252). For example, the reference boundary pixel data provided to the latch may be provided to the compressor 220 with a delay. In some cases, a latch may include a 1-bit memory cell. A latch may allow circuits to store data and deliver the data at a later time (e.g., a latch may delay when reference boundary pixel data is provided), rather delivering data at the time it is obtained. Accordingly, reference pixel data of a first boundary image of a previous frame image may be delayed to be delivered at substantially the same time as reference pixel data of a second boundary pixel image of the current frame image.

If the reconstructed reference pixel data does not correspond to the boundary pixel data (S250-N), the reconstructed reference pixel data may be stored in the reference pixel buffer 310 (S253). The reference pixel buffer 310 may provide the stored reference pixel data to the compressor 220 (S254). For example, unlike the reference boundary pixel data, the reference pixel data may be provided to the compressor 220 without a delay.

As the reference boundary pixel data is provided with a delay and the reference pixel data is provided without a delay, the reference boundary pixel data may include an image of a previous frame. Therefore, the reference pixel data may include an image of a current frame.

Figure 8:
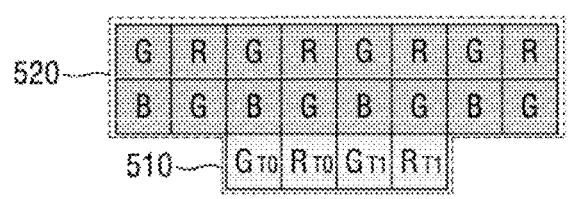
FIG. 8 is a diagram for explaining a method of compressing original pixel data according to some embodiments of the present disclosure.
Figure 8:
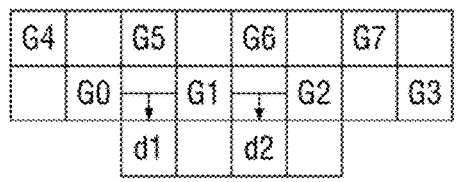
Figure 8:
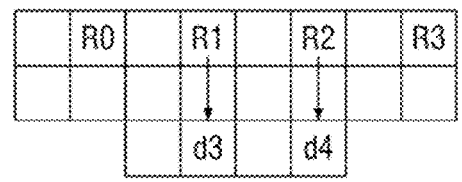
Figure 8:
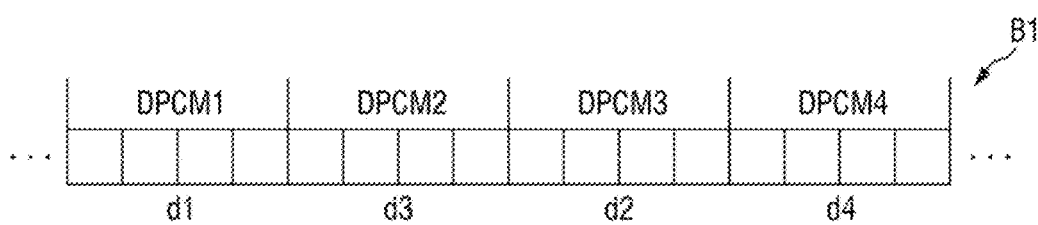

FIG. 8 is a diagram for explaining a method of compressing original pixel data according to some embodiments of the present disclosure.

The encoder 200 may encode the original pixel data based on at least one reference pixel data. For example, the encoder 200 may encode the original pixel data 510 based on the reference pixel data 520. Here, the original pixel data 510 and the reference pixel data 520 may not be included in the boundary pixel image of the Bayer image 500. For example, the original pixel data 510 and the reference pixel data 520 may not be limited to the boundary pixel image of the Bayer image 500. For example, pixels located on the top two lines of the original pixel data 510 may be used as reference pixel data 520.

In some embodiments, the original pixel data 510 may include a first original pixel GT0 as a green pixel, a second original pixel RT0 as a red pixel, a third original pixel GT1 as a green pixel, and a fourth original pixel RT1 as a red pixel. In other embodiments, although the second original pixel RT0 and the fourth original pixel RT1 may be blue pixels, the second original pixel RT0 and the fourth original pixel RT1 are assumed to be red pixels for the sake of convenience of explanation. Each of the original pixel data 510 is a pixel before being compressed. Each pixel value may be represented by a value greater than or equal to 0 and less than 1024.

The bitstream B1 generated by encoding the original pixel data 510 may include pixel regions DPCM1, DPCM2, DPCM3, and DPCM4 that store information on pixel values. For example, a first pixel region DPCM1 may store the encoded data of the first original pixel GT0. A second pixel region DPCM2 may store the encoded data of the second original pixel RT0. A third pixel region DPCM3 may store the encoded data of the third original pixel GT1. A fourth pixel region DPCM4 may store the encoded data of the fourth original pixel RT1.

The encoder 200 may store a difference value d1 between the pixel value of the first original pixel GT0 and the reference value in the first pixel region DPCM1. According to some embodiments, the reference value may include an average value between pixel value of a reference pixel G0 located at the left top of the first original pixel GT0 and pixel value of a reference pixel G1 located at the right top thereof. The difference value d1 may be defined by Equation 1 below.

$$d1=(G0+G1)/2-GT0 \quad (1)$$

The encoder 200 may store a difference value d3 between the pixel value of the second original pixel RT0 and the reference value in the second pixel region DPCM2. According to some embodiments, the reference value may include the pixel value of the reference pixel R1 located on the top of two lines of the second original pixel RT0. The difference value d3 may be defined by Equation 2 below.

$$d3=R1-RT0 \quad (2)$$

The encoder 200 may store a difference value d2 between the pixel value of the third original pixel GT1 and the reference value in the third pixel region DPCM3. According to some embodiments, the reference value may include an average value between pixel value of the reference pixel G1 located on the left top of the third original pixel GT1 and pixel value of a reference pixel G2 located on the right top. The difference value d2 may be defined by Equation 3 below.

$$d2=(G1+G2)/2-GT1 \quad (3)$$

The encoder 200 may store a difference value d4 between the pixel value of the fourth original pixel RT1 and the reference value in the fourth pixel region DPCM4. According to some embodiments, the reference value may include the pixel value of the reference pixel R2 located on the top of two lines of the fourth original pixel RT1. The difference value d4 may be defined by Equation 4 below.

$$d4=R2-RT1 \quad (4)$$

The position of the reference pixel data referred to in the encoding of the original pixel data described with reference to FIG. 8 is an example and may be changed.

Hereinafter, a method of compressing the original pixel data when the reference pixel data is included in the boundary pixel image of the Bayer image 500 will be described with reference to FIGS. 9 and 10.

Figure 9:
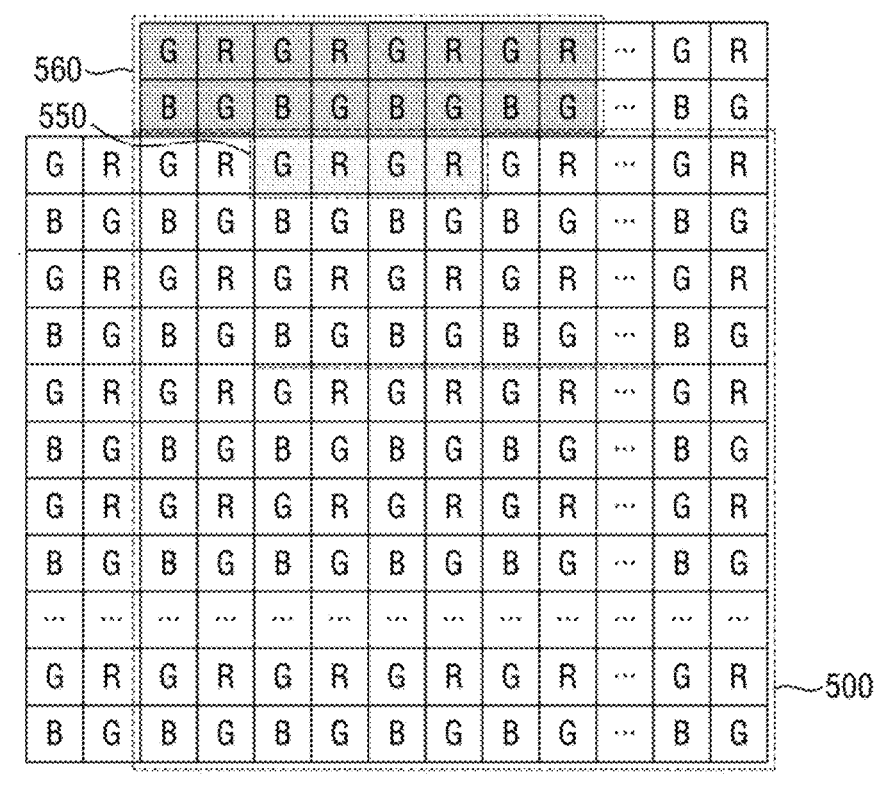
Figure 10:
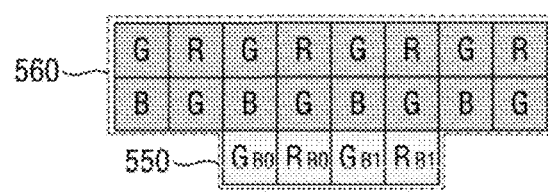
Figure 10:
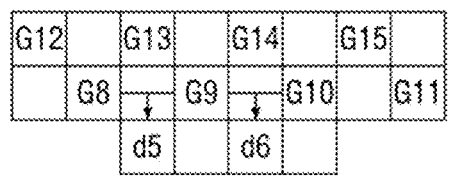
Figure 10:
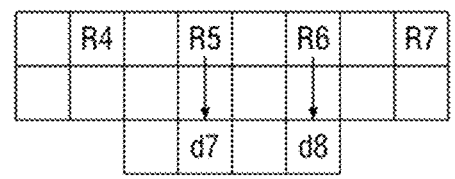
Figure 10:
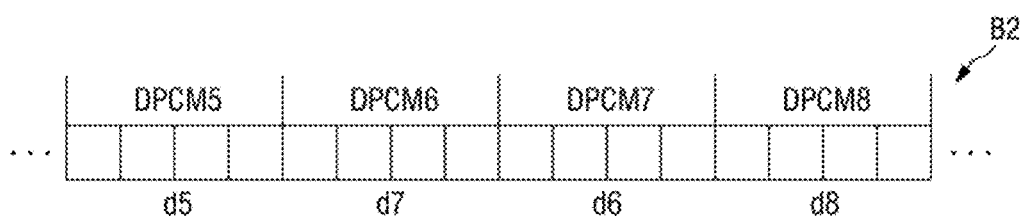

FIGS. 9 and 10 are diagrams for explaining the method of compressing the original pixel data according to some embodiments of the present disclosure.

The encoder 200 may encode the original pixel data based on at least one reference pixel data. For example, referring to FIG. 9, the encoder 200 may encode the original pixel data 550 based on the first reference boundary pixel data 560. Here, although the original pixel data 550 may be included in the boundary pixel image of the Bayer image 500, the embodiments according to the present disclosure are not limited thereto. Further, the first reference boundary pixel data 560 may be included in the boundary pixel image of the Bayer image 500. For example, the first reference boundary pixel data 560 may be included in the boundary pixel image of the Bayer image 500 of the previous frame image.

Referring to FIG. 6, the original pixel data 550 may be stored in the reference pixel buffer 310 and provided to the compressor 220 from the reference pixel buffer 310. The first reference boundary pixel data 560 may be stored in the reference boundary pixel buffer 320, and provided to the compressor 220 with a delay. For example, the first reference boundary pixel data 560 may be included in the boundary pixel image of the Bayer image 500 of the previous frame image of the original pixel data 550 to be compressed.

When the boundary pixel image of the Bayer image 500 is compressed by encoding the original pixel data 550 using the first reference boundary pixel data 560 corresponding to the previous frame, reduction of the compression loss may be possible by the use of the pixel value with the value closest to the pixel value as the reference pixel data.

Referring to FIG. 10, the original pixel data 550 may include a first original pixel GB0 as a green pixel, a second original pixel RB0 as a red pixel, a third original pixel GB1 as a green pixel, and a fourth original pixel RB1 as a red pixel. In some other embodiments, although the second original pixel RB0 and the fourth original pixel RB1 may be blue pixels, the second original pixel RB0 and the fourth original pixel RB1 are assumed to be red pixels for the sake of convenience of explanation. Each of the original pixel data 550 is a pixel before being compressed, and each pixel value may be represented by a value of greater than or equal to 0 and less than 1024.

The bitstream B2 generated by encoding the original pixel data 550 may include pixel regions DPCM5, DPCM6, DPCM7, and DPCM8 that store information on the pixel values.

The encoder 200 may store a difference value d5 between the pixel value of the first original pixel GB0 and the reference value in a fifth pixel region DPCM5. According to some embodiments, the reference value may include an average value between pixel values of a reference pixel G8 located on the left top of the first original pixel GB0 and pixel values of a reference pixel G9 in the right top thereof. The difference value d5 may be defined by Equation 5 below.

$$D5=(G8+G9)/2-GB0 \qquad (5)$$

The encoder 200 may store a difference value d7 between the pixel value of the second original pixel RB0 and the reference value in a sixth pixel region DPCM6. According to some embodiments, the reference value may include a pixel value of a reference pixel R5 located on the top of two lines of the second original pixel RB0. The difference value d7 may be defined by Equation 6 below.

$$d7=R5-RB0 \qquad (6)$$

The encoder 200 may store a difference value d6 between the pixel value of the third original pixel GB1 and the reference value in a seventh pixel region DPCM7. According to some embodiments, the reference value may include an average value between the pixel value of a reference pixel G9 located on the left top of the third original pixel GB1 and the pixel value of a reference pixel G10 located on the right top thereof. The difference value d6 may be defined by Equation 7 below.

$$d6=(G9+G10)/2-GB1 \qquad (7)$$

The encoder 200 may store a difference value d8 between the pixel value of a fourth original pixel RB1 and the reference value in an eighth pixel region DPCM8. According to some embodiments, the reference value may include the pixel value of the reference pixel R6 located on the top of two lines of the fourth original pixel RB1. The difference value d8 may be defined by the following Equation 8.

$$d8=R6-RB1 \qquad (8)$$

The position of the reference pixel data referred to in the encoding of the original pixel data described with reference to FIG. 10 is an example and may be changed.

FIG. 11 is a diagram for explaining a method of compressing original pixel data according to some embodiments of the present disclosure. For the sake of convenience of explanation, repeated parts of contents explained using FIGS. 1 to 10 will be briefly explained or omitted.

Referring to FIG. 11, the encoder 200 may encode the original pixel data 550 based on second reference boundary pixel data 570. The second reference boundary pixel data 570 may be included in the boundary pixel image of the Bayer image 500. For example, the second reference boundary pixel data 570 may be included in the boundary pixel image of the Bayer image 500 of the previous frame image. Referring to FIG. 4, the second reference boundary pixel data 570 may be included in the second boundary pixel data 540. For example, the second reference boundary pixel data 570 may include pixel images of the first and second rows and pixel images of the first and second columns of the boundary of the Bayer image 500.

FIG. 12 is a diagram for explaining a method of compressing original pixel data according to some embodiments of the present disclosure. For the sake of convenience of explanation, repeated parts of contents explained using FIGS. 1 to 10 will be briefly explained or omitted.

Referring to FIG. 12, the encoder 200 may encode the original pixel data 550 based on third reference boundary pixel data 580. The third reference boundary pixel data 580 may be included in the boundary pixel image of the Bayer image 500. The third reference boundary pixel data 580 may include a pixel image of the first row and a pixel image of the first column of the boundary of the Bayer image 500. Additionally or alternatively, the third reference boundary pixel data 580 may further include an image of a portion in which the pixel image of the first row and the pixel image of the first column of the boundary of the Bayer image 500 overlap each other. For example, the encoder 200 may encode the original pixel data 550 based on the pixel data located on the left top of the original pixel data 550, among the third reference boundary pixel data 580.

FIG. 13 is a diagram for explaining a method of compressing original pixel data according to some embodiments of the present disclosure. For the sake of convenience of explanation, repeated parts of contents explained using FIGS. 1 to 10 will be briefly explained or omitted.

Referring to FIG. 13, the encoder 200 may encode the original pixel data 550 based on the fourth reference boundary pixel data 590. The fourth reference boundary pixel data 590 may be an average value of pixel values included in the boundary pixel image of the Bayer image 500 of the previous frame image. Since the fourth reference boundary pixel data 590 includes the average value of pixel values, the stored data can be reduced and reliability may be increased.

Figure 14:
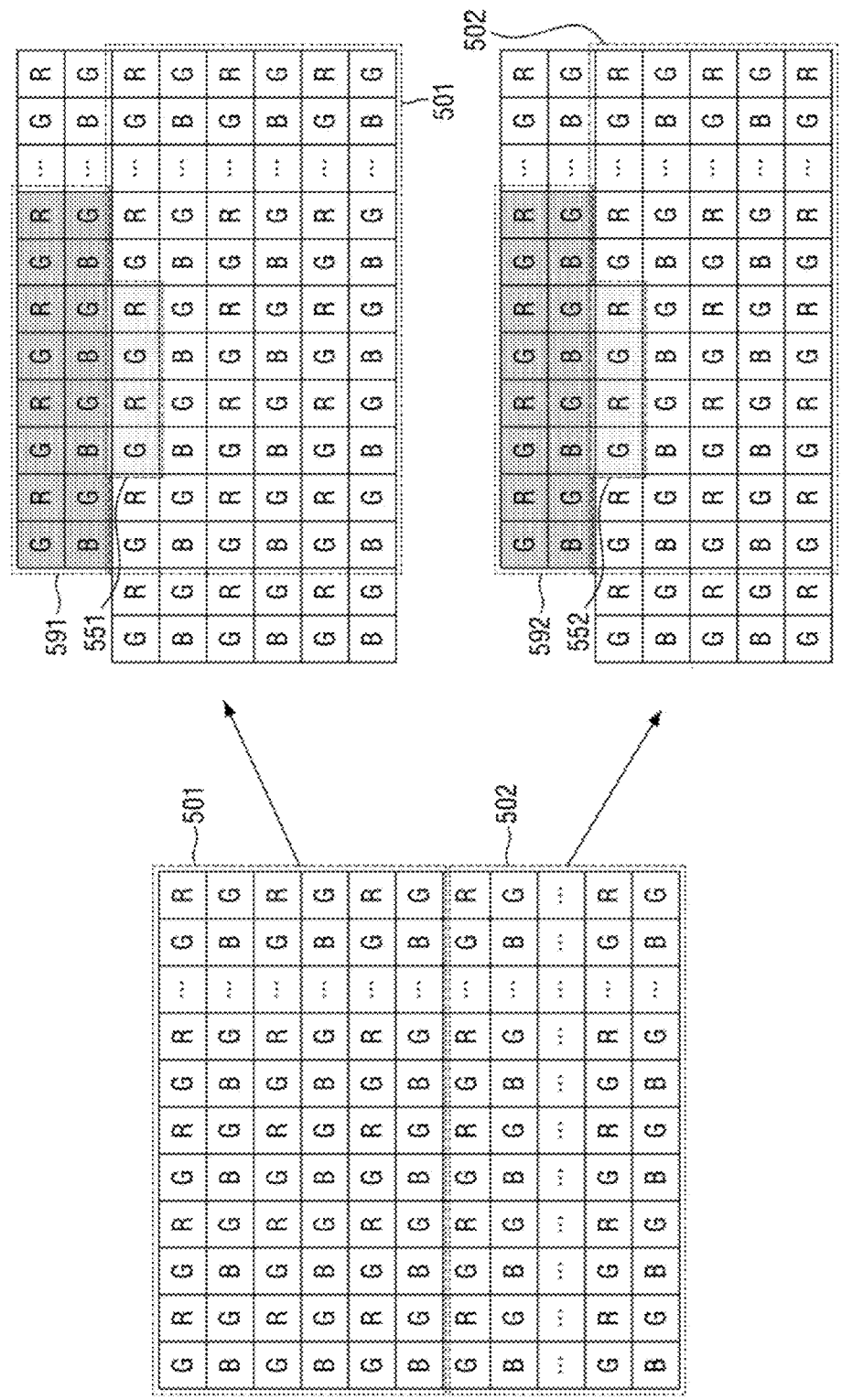
FIG. 14 is a diagram for explaining a method of compressing original pixel data according to some embodiments of the present disclosure.

FIG. 14 is a diagram for explaining a method of compressing original pixel data according to some embodiments of the present disclosure. For the sake of convenience of explanation, repeated parts of contents explained using FIGS. 1 to 10 will be briefly explained or omitted.

Referring to FIG. 14, the Bayer image 500 may include a first region image 501 and a second region image 502. The first region image 501 and the second region image 502 may include regions different from each other. The first region image 501 may include original pixel data 551. The second region image 502 may include original pixel data 552.

The encoder 200 may encode the original pixel data 551 of the first region image 501, based on fifth reference boundary pixel data 591, which may be a boundary pixel image of the first region image 501 corresponding to the previous frame. The encoder 200 may encode the original pixel data 552 of the second region image 502, based on sixth reference boundary pixel data 592, which may be a boundary pixel image of the second region image 502 corresponding to the previous frame. By encoding other regions in the Bayer image 500, increasing compression reliability and reducing compression loss may be possible.

Hereinafter, the encoder 200 will be described with reference to FIGS. 15 and 16. For the sake of convenience of explanation, repeated parts of contents explained using FIGS. 1 to 10 will be briefly explained or omitted.

Figure 15:
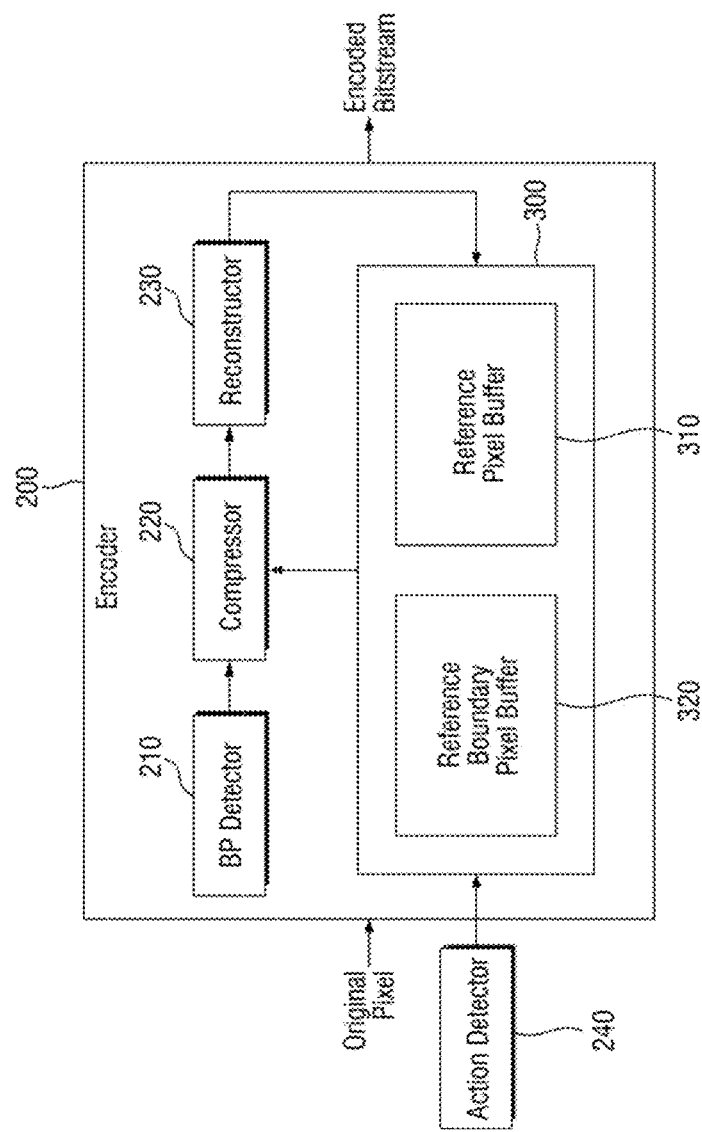
FIG. 15 is a block diagram for explaining an encoder according to some embodiments of the present disclosure.

FIG. 15 is a block diagram for explaining an encoder according to some embodiments of the present disclosure. FIG. 16 is a flowchart for explaining a method of operating the encoder of FIG. 15.

Referring to FIG. 15, the encoder 200 may include an action detector 240. The encoder 200 may adjust the data provided from the buffer 300 to the compressor 220, using the action detector 240.

Figure 16:
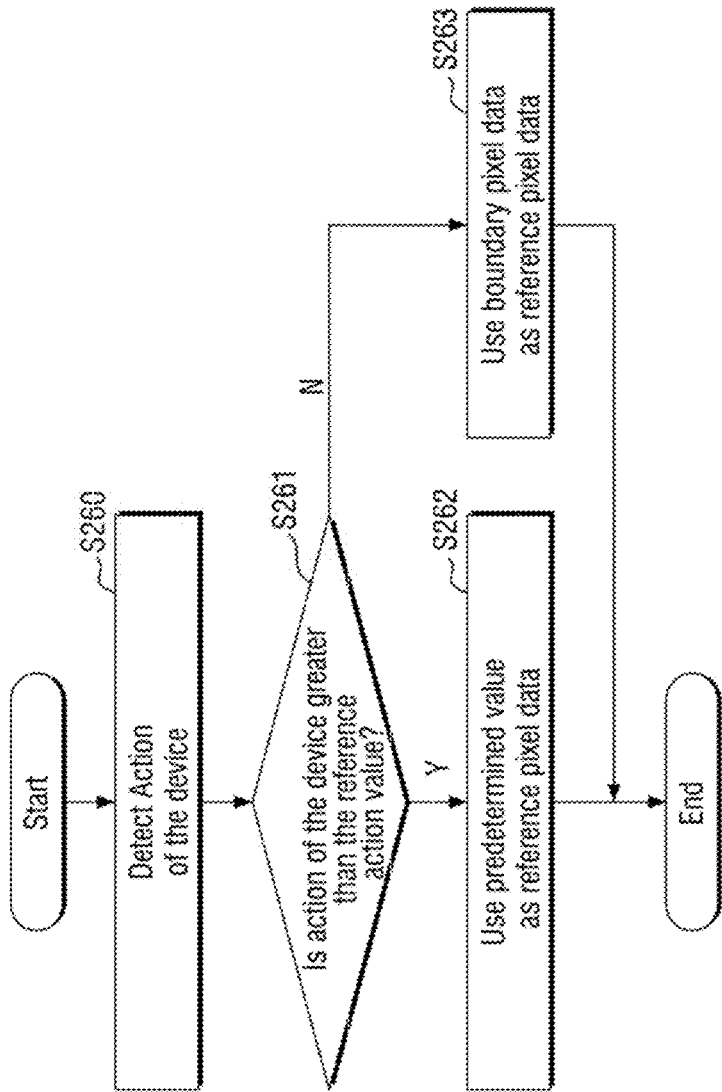
FIG. 16 is a flowchart for explaining a method of operating the encoder of FIG. 15.

Referring to FIG. 16, the action detector 240 may detect the action of the electronic device 1 with the encoder 200 (S260). The action detector 240 may determine whether the action of the electronic device 1 with the encoder 200 is greater than a reference value (S261).

If the detected action of the electronic device 1 is greater than the reference value (S261-Y), the encoder 200 may use predetermined values as pixel data. When the detected action of the electronic device 1 is not greater than the reference value (S261-N), the encoder 200 may use the boundary pixel data as the reference pixel data (S263). If the action of the electronic device 1 is rough, since the pixel value of the previous frame may not be similar to the pixel value of the current frame, the predetermined value may be used as the reference pixel data to provide the encoder 200 of increased compressibility. For example, action detector 240 may detect whether the electronic device 1 has been moved or repositioned to the extent that a subsequent frame image may not have similar boundary images with a previously capture frame image. In some examples, the action detector 240 may include an accelerometer, a gyroscope, an inertial measurement unit (IMU), etc. In some examples, the action detector 240 may be any sensor capable of determining that pixel values of a previous frame may not be similar to corresponding pixel values of the current frame.

Figure 17:
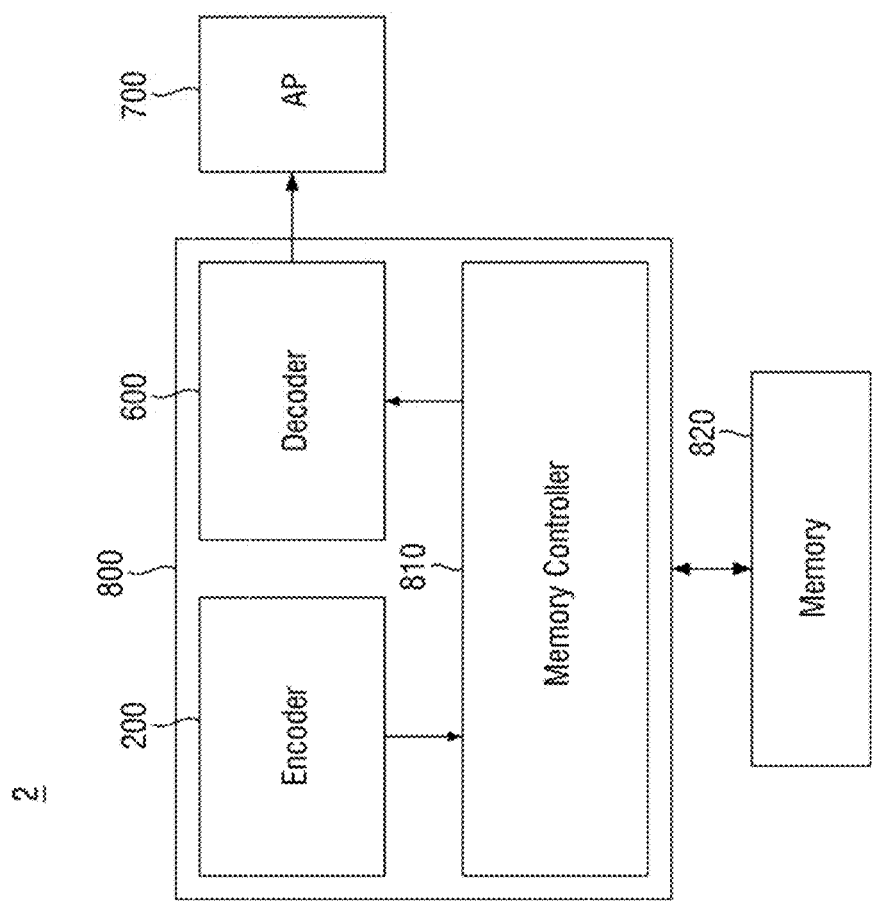
FIG. 17 is a block diagram for explaining an electronic device with an image encoder according to some embodiments of the present disclosure.

FIG. 17 is a block diagram for explaining an electronic device with an image encoder, according to some embodiments of the present disclosure. For the sake of convenience of explanation, repeated parts of contents explained using FIGS. 1 to 16 will be briefly explained or omitted.

Referring to FIG. 17, the electronic device 2 may include an image sensing device 800, a memory 820 and an application processor 700.

The image sensing device 800 may include an encoder 200, a decoder 600, and a memory controller 810. The bitstream generated by the encoder 200 may be transmitted to the memory controller 810.

The memory controller 810 may control the input and output operations of encoded data of the memory 820. The bitstream generated by the encoder 200 may be input to the memory 820 under the control of the memory controller 810. The memory controller 810 may include dedicated logic circuits (e.g., FPGAs, ASICs, etc.) that perform various operations for controlling the overall operations within the memory 820.

The memory 820 is connected to the image sensing device 800 and may store image frames. The memory 820 may store the encoded data generated by the encoder 200 rather than the original data of the image frames. Therefore, the number of image frames stored in the memory 820 may increase as compared to a case in which the original data is stored in the memory 820.

The memory 820 may output a bitstream with the encoded data to the decoder 600 under the control of the memory controller 810. The decoder 600 may perform an operation of decoding the bitstream. For example, the decoder 600 may generate reconstructed image data from the bitstream received from the memory controller 810.

Figure 18:
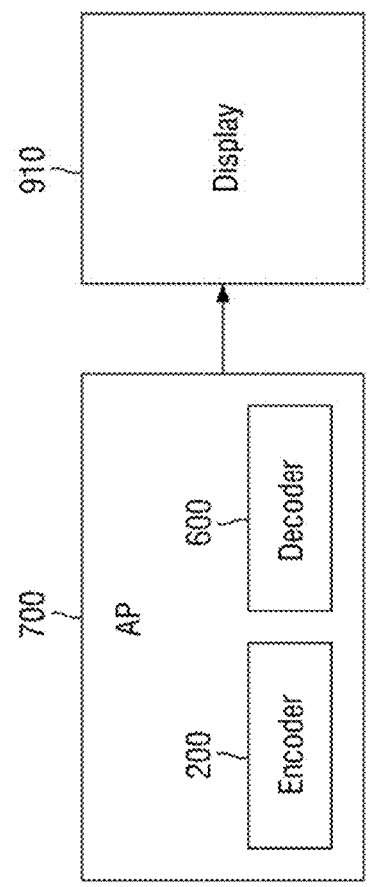
FIG. 18 is a block diagram for explaining an electronic device with an image encoder according to some embodiments of the present disclosure.

FIG. 18 is a block diagram for explaining an electronic device with an image encoder, according to some embodiments of the present disclosure. For the sake of convenience of explanation, repeated parts of contents explained using FIGS. 1 to 16 will be briefly explained or omitted.

Referring to FIG. 18, the electronic device 3 may include an application processor 700 and a display device 910.

The application processor 700 may include an encoder 200 and a decoder 600. The encoder 200 in the application processor 700 may encode and compress the original image data. The decoder 600 in the application processor 700 may decode the encoded bitstream to output image data.

The application processor 700 may transfer the image data output from the decoder 600 to the display device 910. The application processor 700 compresses the image data input to the application processor 700 through the encoder 200 and the decoder 600 without loss, decompresses the image data without loss, and transfers the image data to the display device 910 to display the same. Display device 910 may comprise a conventional monitor, a monitor coupled with an integrated display, an integrated display (e.g., an LCD display), or other means for viewing associated data or processing information. Output devices other than the display can be used, such as printers, other computers or data storage devices, and computer networks.

Hereinafter, an electronic device with a plurality of camera modules 1100a, 1100b, and 1100c will be described with reference to FIGS. 19 and 20. For the sake of convenience of explanation, repeated parts of contents explained using FIGS. 1 to 16 will be briefly explained or omitted. Each of the camera modules 1100a, 1100b and 1100c may include the same encoder 200 as that described using FIGS. 1 to 16.

Figure 19:
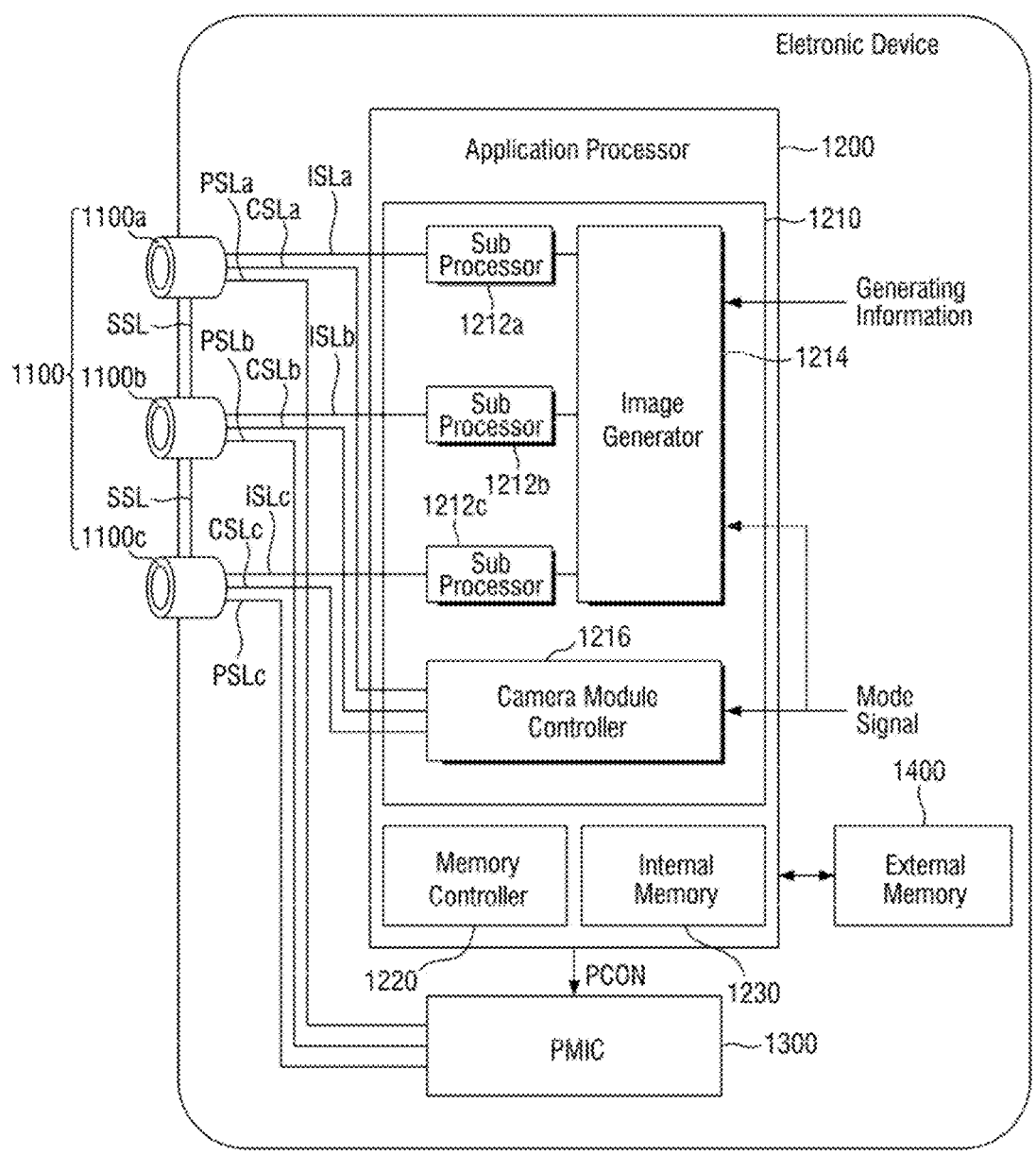
FIG. 19 is a block diagram for explaining an electronic device with a multi-camera module according to some embodiments of the present disclosure.

FIG. 19 is a block diagram for explaining an electronic device with a multi-camera module, according to some embodiments of the present disclosure. FIG. 20 is a detailed block diagram of the camera module of FIG. 19.

Referring to FIG. 19, the electronic device 4 may include a camera module group 1100, an application processor 1200, a power management integrated circuit (PMIC) 1300, and an external memory 1400.

The camera module group 1100 may include a plurality of camera modules 1100a, 1100b, and 1100c. Although an example in which three camera modules 1100a, 1100b and 1100c are placed is shown in the drawing, the embodiments are not limited thereto. In some embodiments, the camera module group 1100 may include two camera modules. Also, in some embodiments, the camera module group 1100 may include n (n is a natural number equal to or greater than 4) camera modules.

Hereinafter, although a detailed configuration of the camera module 1100b will be described more specifically with reference to FIG. 20, the following description may be similarly applied to other camera modules 1100a and 1100c, according to the embodiments.

Figure 20:
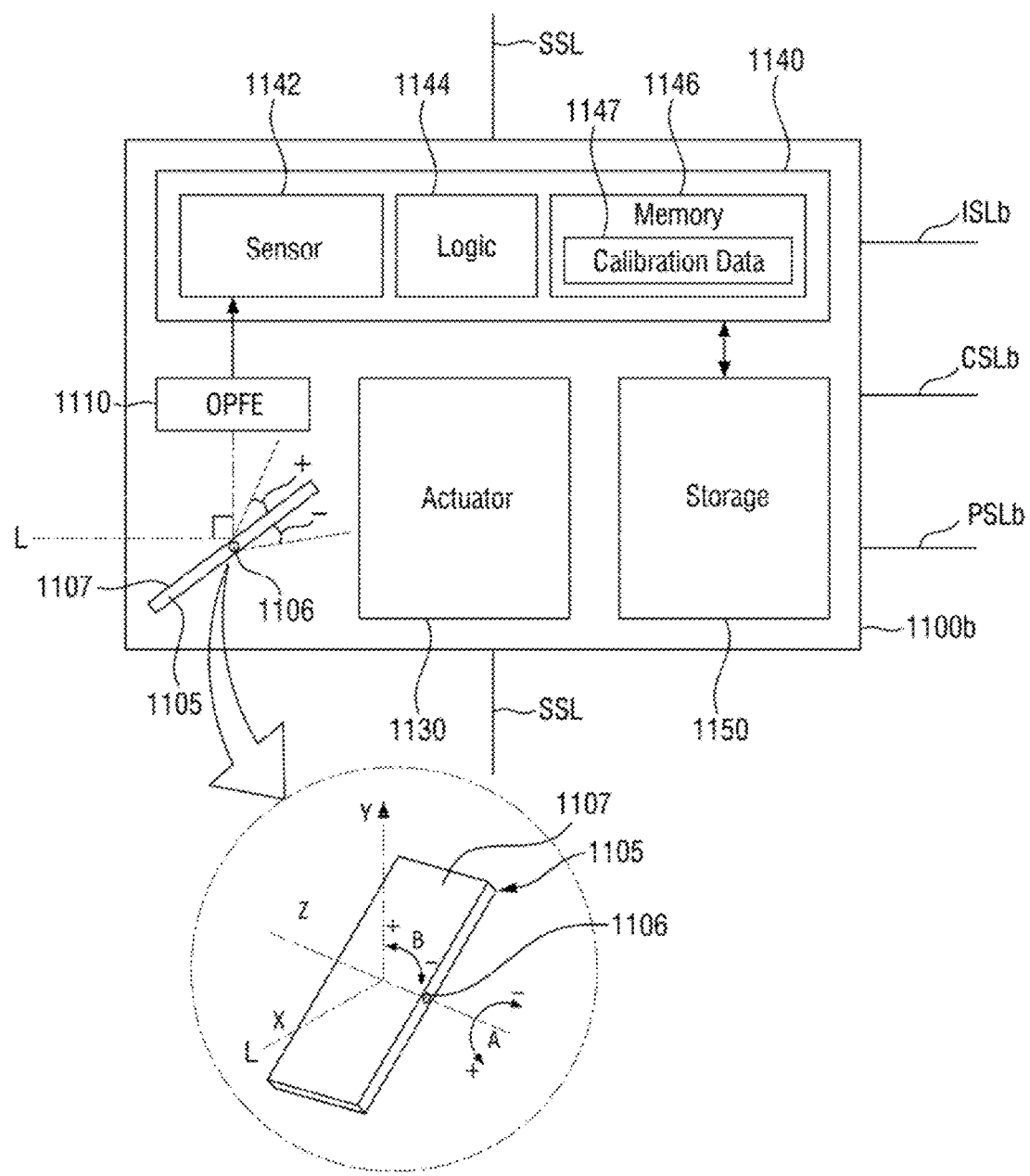
FIG. 20 is a detailed block diagram of the camera module of FIG. 19.

Referring to FIG. 20, the camera module 1100b may include a prism 1105, an optical path folding element (hereinafter, "OPFE") 1110, an actuator 1130, an image sensing device 1140, and a storage 1150.

The prism 1105 may include a reflecting surface 1107 of a light-reflecting substance to deform a path of light L incident from the outside.

In some embodiments, the prism 1105 may change the path of light L incident in a first direction X, to a second direction Y perpendicular to the first direction X. Further, the prism 1105 may rotate the reflecting surface 1107 of the light-reflecting substance in a direction A around a central axis 1106 or rotate the central axis 1106 in a direction B, thereby changing the path of the light L incident in the first direction X, to the vertical second direction Y. The OPFE 1110 may also move in a third direction Z perpendicular to the first direction X and the second direction Y.

In some embodiments, as shown, although a maximum rotation angle of the prism 1105 in the direction A is equal to or less than 15 degrees in a positive (+) direction A and may be greater than 15 degrees in a negative (−) direction A, the embodiments are not limited thereto.

In some embodiments, the prism 1105 may move about 20 degrees, or between 10 degrees and 20 degrees, or between 15 degrees and 20 degrees in the positive (+) or negative (−) direction B. Here, the moving angle may move by the same angle in the positive (+) or negative (−) direction B, or may move to almost the same angle within the range of about 1 degree.

In some embodiments, the prism 1105 may move the reflecting surface 1107 of the light-reflecting substance in a third direction (e.g., a direction Z) parallel to an extension direction of the central axis 1106.

The OPFE 1110 may include, for example, an optical lens with m (where m is a natural number) groups. The m lenses may move in the second direction Y to change an optical zoom ratio of the camera module 1100b. For example, when a basic optical zoom ratio of the camera module 1100b is set to Z, if the m optical lenses included in the OPFE 1110 are moved, the optical zoom ratio of the camera module 1100b may be changed to 3Z or 5Z or an optical zoom ratio greater than 5Z.

The actuator 1130 may move the OPFE 1110 or an optical lens (hereinafter referred to as an optical lens) to a specific position. For example, the actuator 1130 may adjust the position of the optical lens so that the image sensor 1142 is located at a focal length of the optical lens for accurate sensing.

The image sensing device 1140 may include an image sensor 1142, control logic 1144, and a memory 1146. Although the image sensing device 1140 may include the same encoder 200 as that described using FIGS. 1 to 16, embodiments according to the technical idea of the present disclosure are not limited thereto, and the encoder 200 may be included in other configurations of the camera module 1100b. The image sensor 1142 may sense the image of the sensing target using the light L provided by the optical lens. The control logic 1144 may control the overall operations of the camera module 1100b. For example, the control logic 1144 may control the operation of the camera module 1100b in accordance with the control signal provided through a control signal line (CSL) such as CSLb.

The memory 1146 may store information for the operation of the camera module 1100b, such as calibration data 1147. The calibration data 1147 may include information for the camera module 1100b to generate image data using the light L provided from the outside. The calibration data 1147 may include, for example, information on the degree of rotation described above, information on the focal length, information on the optical axis, and the like. If the camera module 1100b is implemented in the form of a multi-state camera in which the focal length changes depending on the position of the optical lens, the calibration data 1147 may include information on the focal length value for each position (for each state) of the optical lens and auto-focusing.

The storage 1150 may store the image data sensed through the image sensor 1142. For example, the storage 1150 may store image data (e.g., a bitstream) encoded by the encoder 200. The storage 1150 may be placed outside the image sensing device 1140 and may be implemented in the form of stacking a sensor chip that constitutes the image sensing device 1140. In some embodiments, although the storage 1150 may be implemented as an EEPROM (Electrically Erasable Programmable Read-Only Memory), the embodiments are not limited thereto.

Referring to FIGS. 19 and 20 together, in some embodiments, each of the plurality of camera modules 1100a, 1100b, and 1100c may include an actuator 1130. Therefore, each of the plurality of camera modules 1100a, 1100b, and 1100c may include the same or different calibration data 1147 according to the operation of the actuator 1130 included therein.

In some embodiments, one camera module (e.g., 1100b) of the plurality of camera modules 1100a, 1100b, and 1100c may be a folded lens type camera module with the prism 1105 and the OPFE 1110 described above, and the remaining camera modules (e.g., 1100a and 1100c) may be vertical type camera modules that do not include the prism 1105 and the OPFE 1110. However, the embodiments are not limited thereto.

In some embodiments, one camera module (e.g., 1100c) of the plurality of camera modules 1100a, 1100b, and 1100c may be a vertical type depth camera which extracts depth information, for example, using an Infrared (IR) Rays. In this case, the application processor 1200 may merge image data provided from such a depth camera and the image data provided from other camera modules (e.g., 1100a or 1100b) to generate a 3D depth image.

In some embodiments, at least two camera modules (e.g., 1100a and 1100b) of the plurality of camera modules 1100a, 1100b, and 1100c may have a field of view different from each other. In this case, for example, at least two camera modules (e.g., 1100a and 1100b) of the plurality of camera modules 1100a, 1100b, and 1100c may have optical lenses different from each other, but the present disclosure is not limited thereto.

Also, in some embodiments, the fields of view of each of the plurality of camera modules 1100a, 1100b, and 1100c may be different from each other. In this case, although the optical lenses included in each of the plurality of camera modules 1100a, 1100b, and 1100c may be different from each other, the embodiments are not limited thereto.

In some embodiments, each of the plurality of camera modules 1100a, 1100b, and 1100c may be located to be physically separated from each other. In other words, the plurality of camera modules 1100a, 1100b, and 1100c does not dividedly use the sensing region of one image sensor 1142, but an independent image sensor 1142 may be placed inside each of the plurality of camera modules 1100a, 1100b, and 1100c.

Referring to FIG. 19 again, the application processor 1200 may include an image processor 1210, a memory controller 1220, and an internal memory 1230. The application processor 1200 may be implemented separately from the plurality of camera modules 1100a, 1100b, and 1100c. For example, the application processor 1200 and the plurality of camera modules 1100a, 1100b, and 1100c may be implemented by separate semiconductor chips separately from each other.

The image processor 1210 may include a plurality of sub-image processors 1212a, 1212b, and 1212c, an image generator 1214, and a camera module controller 1216.

The image processor 1210 may include a plurality of sub-image processors 1212a, 1212b, and 1212c of the number corresponding to the number of the plurality of camera modules 1100a, 1100b, and 1100c.

The image data generated from each of the camera modules 1100a, 1100b, and 1100c may be provided to the corresponding sub-image processors 1212a, 1212b, and 1212c through the image signal lines (ISLs) such as ISLa, ISLb, and ISLc separated from each other. The image data provided through the image signal lines ISLa, ISLb, and ISLc may include bitstream output from the encoder 200. For example, the image data generated from the camera module 1100a may be provided to the sub-image processor 1212a through the image signal line ISLa. The image data generated from the camera module 1100b may be provided to the sub-image processor 1212b through the image signal line ISLb. The image data generated from the camera module 1100c may be provided to the sub-image processor 1212c through the image signal line ISLc. Although the image data transmission may be executed, for example, using a camera serial interface (CSI) based on a Mobile Industry Processor Interface (MIPI), the embodiments are not limited thereto.

Meanwhile, in some embodiments, one sub-image processor may be placed to correspond to a plurality of camera modules. For example, the sub-image processor 1212a and the sub-image processor 1212c are not implemented separately from each other as shown. The sub-image processor 1212a and the sub-image processor 1212c may be implemented by being integrated into a single sub-image processor, the image data provided from the camera module 1100a and the camera module 1100c are selected through a selection element (e.g., a multiplexer) or the like, and then may be provided to the integrated sub-image processor.

The image data provided to each of the sub-image processors 1212a, 1212b, and 1212c may be provided to an image generator 1214. The image generator 1214 may generate an output image, using the image data provided from the respective sub-image processors 1212a, 1212b, and 1212c in accordance with the image generating information or the mode signal.

The image generator 1214 may merge at least some of the image data generated from the camera modules 1100a, 1100b, and 1100c with different fields of view to generate an output image, according to the image generating information or the mode signal. Additionally or alternatively, the image generator 1214 may select one of the image data generated from the camera modules 1100a, 1100b, and 1100c with different fields of view to generate the output image in accordance with the image generating information or the mode signal.

In some embodiments, the image generating information may include a zoom signal or zoom factor. Also, in some embodiments, the mode signal may be, for example, a signal based on a mode selected from a user.

When the image generating information is a zoom signal (zoom factor) and the respective camera modules 1100a, 1100b, and 1100c have different observation views (fields of view) from each other, the image generator 1214 may perform different operations from each other depending on the type of zoom signals. For example, if the zoom signal is a first signal, after the image data output from the camera module 1100a is merged with the image data output from the camera module 1100c, an output image may be generated, using the merged image signal and the image data output from the camera module 1100b not used in merging. If the zoom signal is a second signal different from the first signal, the image generator 1214 does not perform the image data merging but may select one of the image data output from the respective camera modules 1100a, 1100b, and 1100c to generate an output image. However, the embodiments are not limited thereto, and the method of processing image data may be variously modified and implemented as needed.

In some embodiments, the image generator 1214 may receive a plurality of image data with different exposure times from at least one of the plurality of sub-image processors 1212a, 1212b, and 1212c, and perform a high dynamic range (HDR) process on the plurality of image data, thereby generating merged image data with an increased dynamic range.

The camera module controller 1216 may provide control signals to each of the camera modules 1100a, 1100b, and 1100c. The control signal generated from the camera module controller 1216 may be provided to the corresponding camera modules 1100a, 1100b, and 1100c through the control signal lines CSLa, CSLb and CSLc separated from each other.

One of the plurality of camera modules 1100a, 1100b, and 1100c may be designated as a master camera (e.g., 1100b) according to image generating information with a zoom signal or a mode signal, and the remaining camera modules (e.g., 1100a and 1100b) may be designated as dependent cameras. The information is included in the control signal and may be provided to the corresponding camera modules 1100a, 1100b, and 1100c through the control signal lines CSLa, CSLb, and CSLc separated from each other.

The camera modules operating as a master and a dependent may be changed depending on the zoom factor or the operating mode signal. For example, the camera module 1100b may operate as the master and the camera module 1100a may operate as a dependent when the field of view of the camera module 1100a is wider than that of the camera module 1100b, and the zoom factor shows a low zoom ratio. Additionally or alternatively, when the zoom factor shows a high zoom ratio, the camera module 1100a may operate as a master, and the camera module 1100b may operate as a dependent.

In some embodiments, the control signals provided from the camera module controller 1216 to the respective camera modules 1100a, 1100b, and 1100c may include sync enable signals. For example, when the camera module 1100b is a master camera and the camera modules 1100a and 1100c are dependent cameras, the camera module controller 1216 may transmit a sync enable signal to the camera module 1100b. The camera module 1100b provided with the sync enable signal generates a sync signal based on the provided sync enable signal, and may provide the generated sync signal to the camera modules 1100a and 1100c through the sync signal line SSL. The camera module 1100b and the camera modules 1100a and 1100c may transmit image data to the application processor 1200 in synchronization with such a sync signal.

In some embodiments, the control signal provided from the camera module controller 1216 to the plurality of camera modules 1100a, 1100b, and 1100c may include mode information according to the mode signal. The plurality of camera modules 1100a, 1100b, and 1100c may operate in the first operating mode and the second operating mode in relation to the sensing speed based on the mode information.

The plurality of camera modules 1100a, 1100b, and 1100c generates an image signal at a first speed in the first operating mode (e.g., generates an image signal of a first frame rate). The plurality of camera modules 1100a, 1100b, and 1100c also encodes the image signal at a second speed higher than the first speed (e.g., encodes an image signal of a second frame rate higher than the first frame rate). Additionally or alternatively, The plurality of camera modules 1100a, 1100b, and 1100c may transmit the encoded image signal to the application processor 1200. The second speed may be equal to or less than 30 times the first speed.

The application processor 1200 stores the received image signal, for example, the encoded image signal, in a memory 1230 provided inside or in an external storage 1400 of the application processor 1200, then reads and decodes the encoded image signal from the memory 1230 or the storage 1400, and may display image data generated based on the decoded image signal. For example, the corresponding sub-processors of the plurality of sub-processors 1212a, 1212b and 1212c of the image processor 1210 may perform decoding, and the image processing may be performed on the decoded image signal.

The plurality of camera modules 1100a, 1100b, and 1100c generates an image signal at a third speed lower than the first speed in the second operating mode (for example, generates an image signal of a third frame rate lower than the first frame rate), and may transmit the image signal to the application processor 1200. The image signal provided to the application processor 1200 may be a non-encoded signal. The application processor 1200 may perform image processing on the received image signal or may store the image signal in the memory 1230 or the storage 1400.

The PMIC 1300 may supply power, for example, a power supply voltage to each of the plurality of camera modules 1100a, 1100b, and 1100c. For example, the PMIC 1300 may supply the first power to the camera module 1100a through a power signal line PSLa, supply a second power to the camera module 1100b through a power signal line PSLb, and supply a third power to the camera module 1100c through a power signal line PSLc, under the control of the application processor 1200.

The PMIC 1300 generates power corresponding to each of the plurality of camera modules 1100a, 1100b, and 1100c in response to a power control signal PCON from the application processor 1200, and may adjust a power level. The power control signal PCON may include a power adjustment signal for each operating mode of the plurality of camera modules 1100a, 1100b, and 1100c. For example, the operating mode may include a low power mode, and the power control signal PCON may include information about the camera module operating in the low power mode and the power level to be set. The levels of powers provided to each of the plurality of camera modules 1100a, 1100b, and 1100c may be the same as or different from each other. Also, the power level may be changed dynamically.

In concluding the detailed description, those skilled in the art will appreciate that many variations and modifications may be made to the embodiments without substantially departing from the principles of the present disclosure. Therefore, the disclosed embodiments of the disclosure are used in a generic and descriptive sense only and not for purposes of limitation.

What is claimed is:

1. An image sensing device comprising:
   an image signal processor configured to receive a first frame image and a second frame image that temporally follows the first frame image and generate a compressed image of the second frame image based on a boundary pixel image of the first frame image,
   the image signal processor comprising:
   a memory configured to store first reference pixel data which is the boundary pixel image of the first frame image; and
   a compressor configured to receive the first reference pixel data from the memory and generate a bitstream obtained by encoding the second frame image based on a difference value between the first reference pixel data and original pixel data of the second frame image,
   wherein the image signal processor generates the compressed image of the second frame image based on the bitstream.

2. The image sensing device of claim 1, further comprising:
   a reconstructor configured to reconstruct the bitstream to generate second reference pixel data which is a second boundary pixel image of the second frame image,
   wherein the memory is configured to store the second reference pixel data and provide the second reference pixel data to the compressor.

3. The image sensing device of claim 2, wherein the compressor is configured to generate the bitstream obtained by encoding the second frame image based on a second difference value between the second frame image and the second reference pixel data provided from the memory.

4. The image sensing device of claim 2, wherein the memory includes a reference pixel buffer memory and a reference boundary pixel buffer memory, and
   the first reference pixel data is stored in the reference boundary pixel buffer memory and the second reference pixel data is stored in the reference pixel buffer memory.

5. The image sensing device of claim 4, wherein the first reference pixel data provided from the reference boundary pixel buffer memory is provided through a latch.

6. The image sensing device of claim 4, wherein the memory is configured to provide the first reference pixel data and the second reference pixel data to the compressor at substantially the same time.

7. The image sensing device of claim 1, wherein the compressor is configured to generate the bitstream based on a second difference value between second reference pixel data and the first reference pixel data provided from the memory, the second reference pixel data which is a second boundary pixel image of the second frame image.

8. The image sensing device of claim 1, wherein the boundary pixel image of the first frame image includes an image included in a first row of the first frame image.

9. The image sensing device of claim 1, wherein the boundary pixel image of the first frame image includes an image included in a first column of the first frame image.

10. The image sensing device of claim 1, wherein the memory is configured to store third reference pixel data which is the boundary pixel image of the first frame image, the third reference pixel data different from the first reference pixel data, and the compressor is configured to generate the bitstream based on a second difference value between the original pixel data of the second frame image and an average value of the first reference pixel data and the third reference pixel data provided from the memory.

11. The image sensing device of claim 1, further comprising:

an action detector configured to detect whether an action of the image sensing device is greater than a reference value, wherein the compressor generates the bitstream based on a second difference value between the original pixel data of the second frame image and constant reference pixel data based on the action detector detecting the action of the image sensing device is greater than the reference value.

12. The image sensing device of claim 1, further comprising:

an image decoder configured to decode the bitstream.

13. An image encoder configured to receive a first frame image and a second frame image that temporally follows the first frame image, the image encoder comprising:

a memory configured to store first reference pixel data which is a boundary pixel image of the first frame image;

a compressor configured to receive the first reference pixel data from the memory, generate a first bitstream obtained by encoding original pixel data of the second frame image based on a difference value between the first reference pixel data and the original pixel data of the second frame image, and output the first generated bitstream; and a reconstructor configured to reconstruct the first bitstream to generate second reference pixel data which is a second boundary pixel image of the second frame image.

14. The image encoder of claim 13, wherein the memory includes a reference pixel buffer memory and a reference boundary pixel buffer memory, and the first reference pixel data is stored in the reference boundary pixel buffer memory and the second reference pixel data is stored in the reference pixel buffer memory.

15. The image encoder of claim 14, wherein the first reference pixel data provided from the reference boundary pixel buffer memory is provided with a delay.

16. The image encoder of claim 14, wherein the memory is configured to provide the first reference pixel data and the second reference pixel data to the compressor at substantially the same time.

17. The image encoder of claim 13, wherein the memory is configured to store the second reference pixel data, and the compressor is configured to receive the second reference pixel data from the memory and generate a second bitstream obtained by encoding second original pixel data of a third frame image that temporally follows the second frame image based on a second difference value between the second reference pixel data and the second original pixel data of third frame image.

18. The image encoder of claim 17, wherein the reconstructor is configured to reconstruct the second bitstream to generate third reference pixel data which is a third boundary pixel image of the third frame image.

19. A method for operating an image encoder, the method comprising:

receiving a first frame image and a second frame image, wherein the second frame image is received at a different time than the first frame image is received;

storing first reference pixel data which is a first boundary pixel image of the first frame image;

generating a bitstream obtained by encoding original pixel data of the second frame image based on a difference value between the stored first reference pixel data and the original pixel data of the second frame image;

outputting the generated bitstream; and reconstructing the bitstream to generate second reference pixel data which is a second boundary pixel image of the second frame image.

20. The method for operating an image encoder of claim 19, further comprising:

generating the bitstream based on a second difference value between second original pixel data of the second boundary pixel image and the stored first reference pixel data.

* * * * *